United States Patent [19]

Teeter

[11] 4,388,843
[45] Jun. 21, 1983

[54] AUXILIARY TRANSMISSION NEUTRAL POSITIONING AND LOCKING CONTROL AND MECHANISM

[75] Inventor: Terry E. Teeter, Mattawan, Mich.

[73] Assignee: Eaton Corporation, Cleveland, Ohio

[21] Appl. No.: 208,962

[22] Filed: Nov. 21, 1980

[51] Int. Cl.³ .................. F16H 3/08; B60K 41/00; G05G 9/04

[52] U.S. Cl. .................... 74/745; 74/477; 74/15.66; 74/878

[58] Field of Search ............ 74/745, 752 A, 878, 74/15.66, 740, 477

[56] References Cited

U.S. PATENT DOCUMENTS

| | | | |
|---|---|---|---|
| 2,438,539 | 3/1948 | Cook | 74/15.66 |
| 2,761,322 | 9/1956 | Ronan | 74/15.86 |
| 2,798,382 | 7/1957 | Fletcher | 74/477 |
| 2,899,034 | 8/1959 | Hubert | 192/48 |
| 2,958,225 | 11/1960 | Wagner | 74/477 |
| 3,171,300 | 3/1965 | Perkins | 74/745 |
| 3,283,613 | 11/1966 | Perkins | 74/745 |
| 3,648,546 | 3/1972 | McNamara | 74/745 |
| 3,799,002 | 3/1974 | Richards | 74/745 |
| 3,830,111 | 8/1974 | Travaglio | 74/15.4 |
| 4,192,196 | 3/1980 | Bogema | 74/339 |

Primary Examiner—Kenneth Dorner
Assistant Examiner—Dirk Wright
Attorney, Agent, or Firm—C. H. Grace; H. D. Gordon

[57] ABSTRACT

A control (100) for positioning and locking the auxiliary transmission section (13) of a compound change gear transmission (11) in neutral is provided. The control includes a selector switch (132) for activating or deactivating the control and a monitoring device (42) for sensing if the main transmission section (12) is in neutral. The control, once activated, will retain the auxiliary transmission section in neutral until the selector switch is switched to a deactivated position (M) simultaneously with the main transmission section shifted to neutral.

20 Claims, 3 Drawing Figures

AUXILIARY TRANSMISSION NEUTRAL POSITIONING AND LOCKING CONTROL AND MECHANISM

BACKGROUND OF THE INVENTION

1. Field of the Invention

The present invention relates to a control and mechanism for selectively positioning and locking the auxiliary transmission section of a compound transmission in a neutral position. In particular, the present invention relates to a control mechanism for the auxiliary section of a compound transmission of the type comprising at least one auxiliary section countershaft driven by the main transmission section and an auxiliary section output shaft selectively engageable by a shift mechanism with the auxiliary section countershaft and/or auxiliary section input wherein the control mechanism will selectively position and lock the shift mechanism to a neutral position preventing the application of torque from the auxiliary countershaft or input to the auxiliary section output shaft.

2. Description of the Prior Art

Compound change gear transmissions of the type comprising a main transmission section in series with an auxiliary transmission section, usually for vehicles, are well known in the prior art. The auxiliary transmission sections, of both the range and splitter type, usually comprised at least one auxiliary countershaft driven by the main transmission section and an auxiliary output shaft or mainshaft which was selectively clutchable to the auxiliary countershafts and/or directly to the auxiliary input. Often the main transmission section was directly shifted (as by a shift bar linkage assembly) or shifted through air or hydraulic valving, while the auxiliary transmission section was shifted by a master-slave valve control. Examples of such transmissions and controls can be seen by reference to U.S. Pat. Nos. 3,171,300; 3,283,613; 3,648,546; 3,799,002 and 4,192,196, all assigned to the assignee of this invention and all hereby incorporated by reference.

In the past, it has been known that the auxiliary countershafts can be utilized to drive added devices independently of the auxiliary output shaft, i.e. with the vehicle stationary, as through an auxiliary countershaft power take-off ("PTO") or the like. If the added device is to be driven while the vehicle is at rest, the main transmission section must be engaged to supply power to the auxiliary countershaft while the auxiliary mainshaft, or output shaft, must be disengaged, i.e. the auxiliary section must be in neutral.

As the main transmission must be engaged when the PTO was utilized, certain of the prior devices utilized controls to assure that when a power take-off was utilized with a stationary vehicle, the output shaft of the transmission could not be accidently engaged causing the vehicle to become unintentionally mobilized. These prior art controls were not totally satisfactory as they tended to be complicated, difficult to operate, excessively expensive, became inoperative in the event of a failure of the pressurized fluid supply and/or did not provide a positive positioning and locking function for the auxiliary transmission.

SUMMARY OF THE INVENTION

In accordance with the present invention, an improved control for an auxiliary transmission, preferably an auxiliary transmission provided with a countershaft driven power take-off, which will position and lock the auxiliary transmission in neutral is provided. The improved control will positively position and lock the auxiliary transmission in neutral and prevent the auxiliary transmission output shaft from being engaged until the control is deactivated at the same time that the main transmission section is shifted into, or allowed or remain in, neutral.

Accordingly, it is an object of the present invention to provide a new and improved control mechanism for selectively positioning and locking the auxiliary transmission of a compound transmission in neutral.

A further object of the present invention is to provide a new and improved control mechanism for selectively positioning and locking the auxiliary transmission of a compound transmission in neutral which will permit subsequent shifting of the auxiliary transmission into an engaged condition only upon selective deactuation of a control switch at the same time that the main transmission section is in neutral.

These and other objects and advantages of the present invention will become apparent from a reading of the detailed description of the preferred embodiment taken in view of the drawings.

DESCRIPTION OF THE PREFERRED EMBODIMENT

Figure 1:
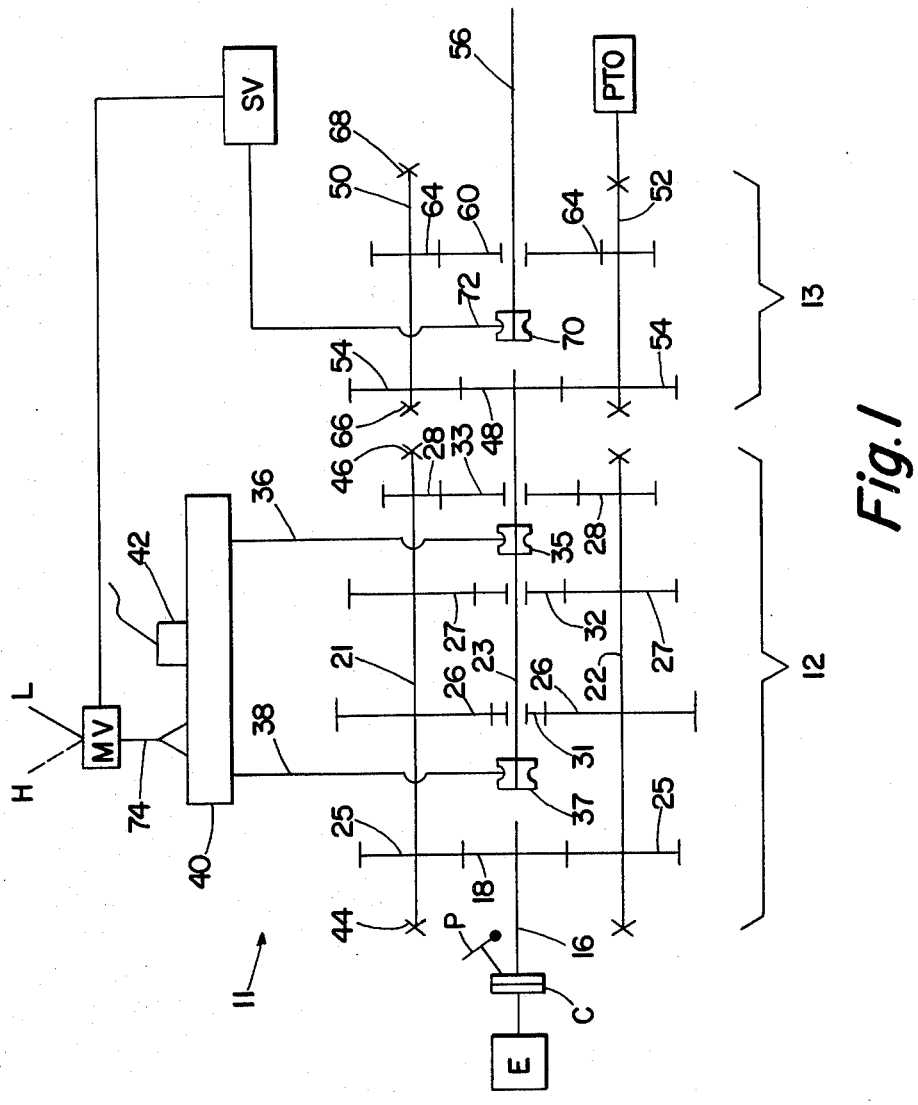
FIG. 1 is a schematic illustration of a compound transmission having a power take-off driven by an auxiliary transmission section countershaft.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer respectively, to the front and rear ends of the transmission as same is conventionally mounted in a vehicle, being respectively the left and right sides of the transmission as illustrated in FIG. 1. The words "inwardly" and "outwardly" will refer to directions toward and away from, respectively, the geometric center of the device and designated part thereof. Said terminology will include the words above specifically mentioned, derivatives thereof and words of similar import.

The term "compound transmission" is used to designate a transmission having a main transmission portion and an auxiliary transmission portion connected in series therewith whereby the selected gear reduction in the main transmission portion may be compounded by further selected gear reduction in the auxiliary transmission portion.

Referring now to FIG. 1, there is illustrated a shiftable, compound change speed transmission 11 having both a main transmission section 12 and an auxiliary transmission section 13, each of which have a plurality of selectable speeds or ratios. The transmission illustrated is generally referred to in the art as a compound transmission and may be of the splitter type of compound transmission, or of the range type of compound transmission or a combination thereof. The main and auxiliary sections are both suitably enclosed by conventional housing means (not shown).

The transmission 11 includes an input shaft 16 provided with an input gear 18 nonrotatably connected thereto, as by splines. The input gear 18 simultaneously drives a plurality of countershafts at equal speeds. In the illustrated embodiment, the transmission is provided with two substantially identical countershafts, 21 and 22, disposed on diametrically opposite sides of the mainshaft 23. It is understood that the present invention is intended for use with transmissions utilizing single as well as multiple countershafts.

The input shaft 16 is normally driven in one direction of rotation only by a primemover, such as a Diesel engine E through a selectively operated, normally engaged, friction master clutch C. Clutch C may be disengaged by use of pedal P as is known in the prior art.

Each of the countershafts, 21 and 22, is provided with an identical grouping of countershaft gears, 25, 26, 27 and 28, which groupings form pairs of gears, such as the pair of gears 26, of identical size and number of teeth and disposed on diametrically opposite sides of mainshaft 23.

A plurality of mainshaft drive gears, 31, 32 and 33, encircle the mainshaft and are selectively clutchable thereto, one at a time, by clutch mechanisms, as described in greater detail hereinafter and in the above incorporated patents.

The mainshaft gears, 31, 32 and 33, encircle the mainshaft 23, are in continuous meshing engagement with, and are floatingly supported by the diametrically opposite pairs of countershaft gears 26, 27 and 28, respectively, which mounting means and the special advantages resulting therefrom are explained in greater detail in U.S. Pat. Nos. 3,105,395 and 3,335,616, both assigned to the assignee of this application and both hereby incorporated by reference. An additional pair of countershaft gears (not shown) engaged with idler gears (not shown) which in turn are engaged with an additional mainshaft gear (not shown) may be provided for providing a selective reverse operation as is well known in the prior art. The forwardmost countershaft gears 25 are continually meshed with and driven by the input gear 18 for causing simultaneous rotation of the countershafts, 21 and 22, whenever the input shaft is rotatably driven.

A first sliding clutch 35 is slidably retained on mainshaft 23, as by splines, and may be axially positioned by shift fork 36 to the neutral position shown, to the right to clutch mainshaft gear 33 to the mainshaft 23 or to the left to clutch mainshaft gear 32 to mainshaft 23. A second sliding clutch 37 is slidably received on the mainshaft 23 and may be selectively axially positioned by shift fork 38 to the neutral position shown, to the right to clutch mainshaft gear 31 to the mainshaft or to the left to clutch the input shaft 16 and/or input gear 18 directly to the mainshaft 23.

Shift forks 36 and 38 are preferably controlled by a conventional shift bar assembly 40 which will include an interlock to prevent movement of one shift fork from the neutral position unless the other shift fork is also in the neutral position, as is well known in the art. The shift bar assembly will also include a means 42 for sensing when all main transmission shift forks are in an axially centered position, i.e. when the main transmission section is in neutral, and providing a signal in response thereto.

Main transmission section countershafts, 21 and 22, are supported by bearings 44 and 46.

The mainshaft 23 extends into the auxiliary transmission section 13 and an auxiliary input gear 48 is rotationally fixed thereto as by splines. A pair of auxiliary countershafts, 50 and 52, are constantly driven by the mainshaft 23 through auxiliary countershaft gears 54 fixed to the auxiliary countershafts and constantly meshed with the auxiliary input gear 48. An output shaft, or auxiliary mainshaft, 56 is provided substantially concentric with mainshaft 23. An auxiliary mainshaft gear 60 surrounds and is selectively clutchable to the output shaft 56. The auxiliary mainshaft gear 60 is supported by, and in constant mesh with, auxiliary countershaft gears 64 fixed to the auxiliary countershafts. The auxiliary countershafts are supported by bearings 66 and 68.

A sliding clutch 70 is slidably received on the output shaft, as by splines, and is axially positioned by a shift fork 72. Shift fork 72 will normally bias the sliding clutch 72 to the right to clutch auxiliary mainshaft gear 60 to the output shaft 56 or to the left to clutch the output shaft 56 directly to the mainshaft 23 and/or the auxiliary input gear 48. The axial position of the mainshaft is normally to the right or the left of the position shown in response to actuation of a slave valve SV controlled by a master valve MV having a high ("H") or low ("L") selection only. The master valve may be separate from or integral with the shift lever 74 of the shift bar housing 40. The shift fork may be positioned and locked in the axially centered position shown in the drawing (i.e. the auxiliary transmission section in neutral) by means of the control 100 of the present invention to be discussed in detail below.

A power take-off unit, PTO, is driven by one of the auxiliary countershafts 52. The PTO may be constantly engaged to the auxiliary countershaft, or preferably, selectively drivingly engageable thereto.

As may be seen, if it is desirable to operate the PTO with the vehicle driven by transmission 11 stationary, the main transmission section must be engaged and the auxiliary transmission section in neutral (i.e. shift fork 72 axially centered). When the PTO is operating with the vehicle stationary, it is important that the auxiliary transmission section be prevented from accidently being engaged, as by accidental bumping of a control mechanism or the like. It is also important that, when it is desirable to place the vehicle in motion, the auxiliary transmission be capable of being engaged in either the low or high (direct) drive mode.

Figure 2:
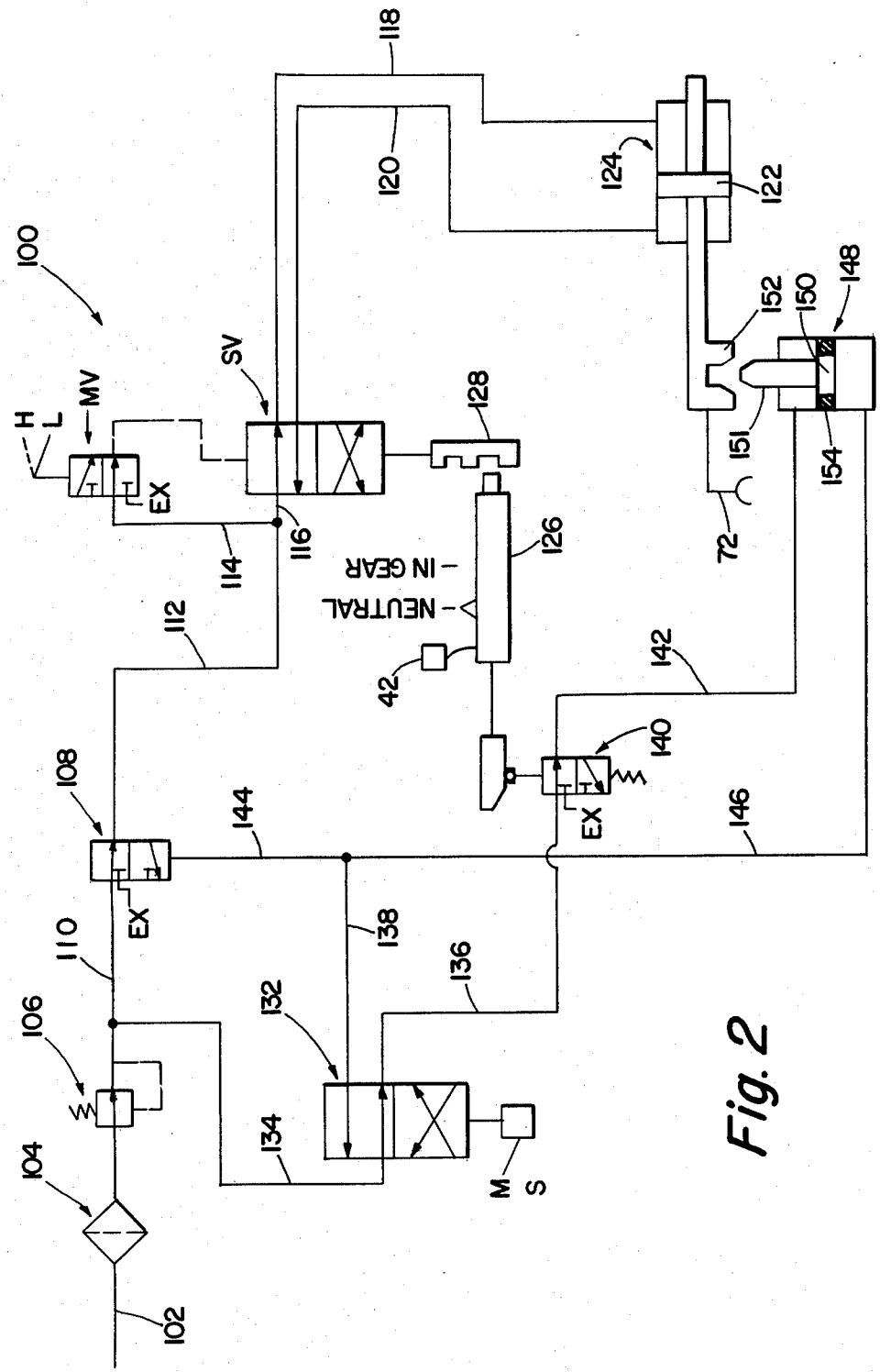
FIG. 2 is a schematic illustration of the control circuit of the present invention.
Figure 3:
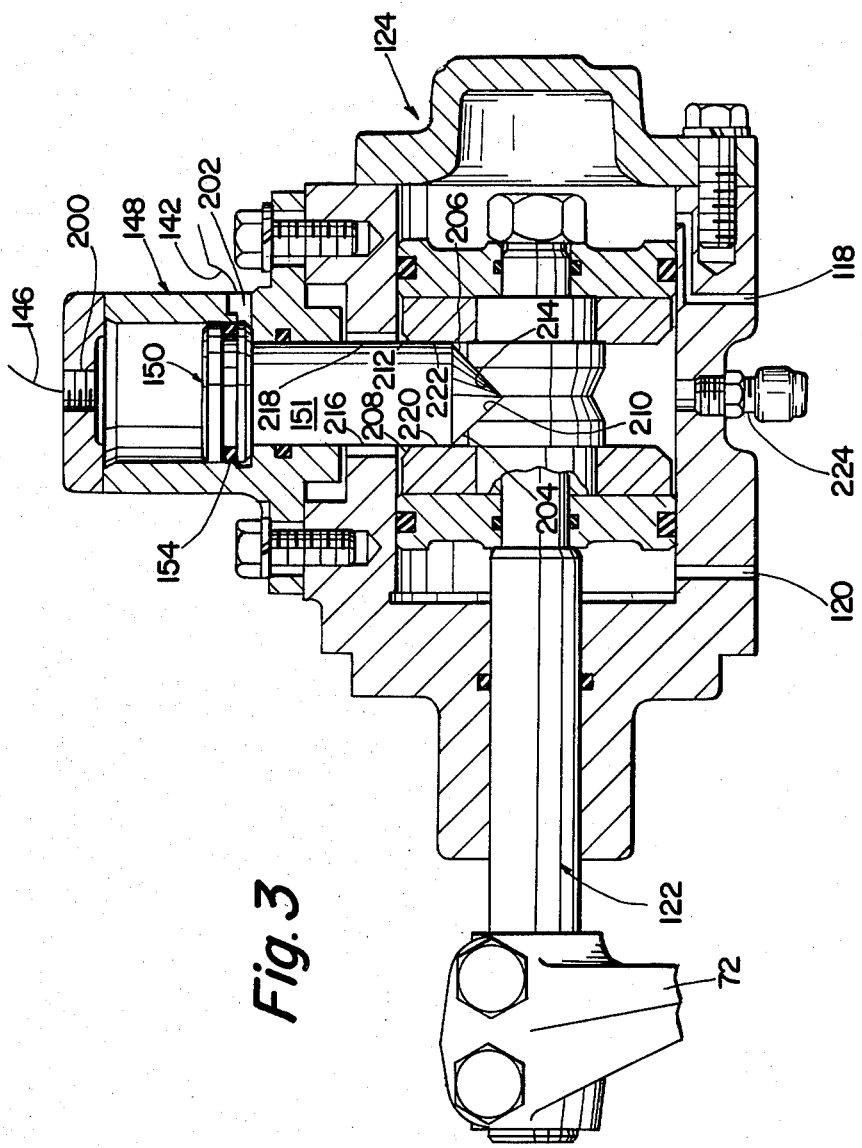
FIG. 3 is a partial view, in section, of the auxiliary transmission section shifting mechanism and positioning and locking mechanism of the control of FIG. 2.

The control system 100 of the present invention may be seen by reference to FIGS. 2 and 3.

An air or fluid control system 100 is schematically illustrated in FIG. 2. It is understood that a comparable mechanical and/or electrical control system may also be utilized within the scope of the present invention.

A source 102 of pressurized fluid, such as pressurized air, such as the vehicle air supply, is filtered and regulated at filter 104 and regulater 106. The air pressure is typically regulated to about 57.5–62.5 P.S.I. The regulated air is directed to a normally open pilot valve 108 via passage 110. The outlet of the pilot valve is, in the open condition, connected to a manually controlled auxiliary section master valve MV via passages 112 and 114 and to the auxiliary slave valve SV via passages 112 and 116. The slave valve SV will either connect passage 118 to passage 116 and exhaust passage 120, or connect passage 120 to passage 116 and exhaust passage 118 to bias the shift piston 122 in shift cylinder 124 to the left or to the right, respectively, to shift the shift fork 72. A mechanical inhibitor 126 will be forced to the right when the signal from sensor 42 indicates the main transmission section is in gear, (i.e. not in neutral) to engage mechanical interlock 138 to prevent movement of the slave valve until the main transmission is shifted to neutral causing the mechanical inhibitor to shift to the right (as shown in FIG. 2).

Regulated air is also supplied to a two position, mobile-stationary selector valve 132 by passage 134. Mobile-stationary valve 132 is preferably located in the vehicle cab and allows the operator to selectively place the vehicle in a stationary condition or a condition permitting mobilization thereof (i.e. allowing the auxiliary transmission output shaft to be engaged).

In the mobile setting ("M") of valve 132, passage 134 is connected to passage 136, and passage 138 is vented to exhaust. In the stationary setting ("S") of valve 132, passage 134 is connected to passage 138 and passage 136 is vented to exhaust.

Passage 136 is connected to a two-position neutral inhibitor valve 140. The neutral inhibitor valve 140 will connect passage 136 to passage 142 if the main transmission is in neutral or will block passage 136 and vent passage 142 to atmosphere if the main transmission is not in neutral.

Passage 138 is connected to passage 144 and, when pressurized, will cause the normally open pilot valve 108 to close, i.e. move upwardly from the position shown, and block passage 110 and to vent passage 112 to atmosphere. Passage 138 also connects to passage 146.

Passage 142 and 146 lead to opposite ends of the positioning and locking cylinder 148. Pressurization of passage 146, and exhaust of passage 142 will cause the positioning and locking piston 150, in the cylinder 148, and the ram 151 axially movable therewith, to move upwardly to engage the positioning and locking block 152 fixed to shift piston 122 to position and lock shift fork 72 in a neutral position. Pressurization of passage 142 and exhaust of passage 146 will result in piston 150 and ram 151 being forced downwardly to disengage the block 152 thus allowing movement of the piston 122. Drag ring 154 on piston 150 will create a frictional drag between piston 150 and cylinder 148 to tend to retain the piston 150 in its current position in the event of loss of system air or a failure of passage 142 and/or 146. Drag ring 154 may be replaced by a spring biased detent, or the like, as is well known in the art.

The operation of control 100 is as follows. Pressurized air from a source, such as the vehicle air system, is filtered and regulated and introduced to passages 110 and 134.

If the operator decides to utilize the PTO with the vehicle in a stationary position, the stationary-mobile selector valve, 132, is placed in the stationary position ("S"), i.e. moved upwardly from the position illustrated in FIG. 2. In this position of valve 132, passage 134 is connected with passages 144 and 146 via passage 138 and passage 136 is vented. Pressurization of passage 144 will move the spring biased pilot valve 108 upwardly venting passage 112, 114, 116, 118, 120 and both sides of cylinder 124. Venting of passage 136 will vent passage 142 and the upper portion of cylinder 148. Pressurization of passage 146 will force the piston and ram, 150, upwardly to engage the positioning and locking block 152 to position and lock the auxiliary shift fork 72 in a neutral position. At this time, the main transmission section may be shifted into a selected gear ratio to drive the PTO with the output shaft 56 stationary. The frictional drag of the drag ring 154 on the cylinder 148 will maintain the piston 150 in its selected position in the event the air supply is interrupted.

The range shift piston 122 and shift fork 72 may only be shifted back to an engaged position upon the occurance of two events, namely the main transmission section shifted to, or remaining in, a neutral position at the same time that the selector valve 132 is placed in the mobile ("M") position, i.e. the position shown in FIG. 2. If the main transmission is not shifted to neutral, the mechanical inhibitor, 126, will force the neutral inhibitor valve 126 to be spring biased to a position upward of that shown in FIG. 2 wherein passage 142 is vented and passage 136 is blocked. If the selector valve remains in the stationary position, air will be supplied to passages 146 forcing the positioning and locking piston and ram upwardly into engagement with block 152, and passage 144 will be pressurized, closing the normally open pilot valve 108 and venting passages 112, 114, 116, 118 and 120.

When the main transmission is shifted into neutral, the inhibitor valve 140 assumes the position shown in FIG. 2 connecting passage 136 to passage 142. If the selector valve 132 is then placed in the mobile position as shown in FIG. 2, passages 138, 144 and 146 are vented. This opens the normally open pilot valve 108 and vents the lower portion of cylinder 148. When selector valve 132 is in the mobile position, passages 132 and 142 are pressurized forcing the positioning and locking piston 150 and ram 151 downwardly out of engagement with block 152. In this condition, the master valve MV may be utilized to pressurize one of either passage 118 and 120 to engage the auxiliary transmission. It is understood that the order of shifting the main transmission section to neutral and the selector valve 132 to mobile may be reversed.

It may thus be seen that, when the selector valve 132 is placed in the stationary position, the output shaft 56 will not be engageable unless the main transmission is first placed, or remains, in neutral at the same time the selector valve 132 is moved to the mobile position.

The structure of the shift cylinder 124 and positioning and locking mechanism may be seen by reference to FIG. 3. In the preferred embodiment, the positioning and locking cylinder 148 is attached to, or formed integrally with, the shift cylinder 124. The shift cylinder 124 is mountable to the auxiliary transmission housing (not shown) as is well known in the art. Fluid connections 200 and 202 are provided in cylinder 124 for connection to passages 146 and 142, respectively. The piston 150 is provided with a drag ring 154 as discussed above. A ram 151 is fixed to, or integral with, the piston 150 for axial movement therewith and is provided with ramps 204 and 206 on the leading end thereof which are complementary with ramps 208 and 212, respectively, on the block 152. The ramps are sufficient, when pressurized air is vented from lines 118 and 120, and line 146 is pressurized, to center the block 152, and shift fork 72, in a neutral position. Ramps 210 and 214 may be provided for clearance purposes. The ram 151 has nontapered sides, 216 and 218, which are engageable by flat surfaces, 220 and 222, respectively, on the shift piston 122 to lock the shift piston 122 and shift fork 72 in the centered position. A vent and/or breather plug 224 may be provided in the shift cylinder 124.

It may thus be seen that the positioning and locking piston, when forced downwardly as shown in FIG. 3 by pressurization of line 146, is effective to position and lock the shift fork 72 in a neutral position for the auxiliary transmission. It may also be seen that once the shift fork 72 is locked in the neutral position, the shift fork may not be subsequently shifted to an engaged position until the main transmission is shifted to, or allowed to remain in, neutral simultaneously with the selector valve 132 switched to the mobile ("M") position.

I claim:

1. A compound change gear transmission comprising a change gear main transmission section connected in series with a change gear auxiliary transmission section;

said main transmission section comprising a main transmission input shaft, a main transmission output shaft and a main transmission shift control for selectively disengaging said main transmission output shaft from said main transmission input shaft and for selectively, drivingly engaging said main transmission input shaft to said main transmission output shaft through one of a plurality of selectively engageable gear ratios;

said auxiliary transmission section comprising an auxiliary transmission input driven by said main transmission output shaft, at least one auxiliary transmission countershaft constantly driven by said auxiliary transmission input, an auxiliary transmission output shaft, a plurality of gears associated with said auxiliary countershaft and said auxiliary output shaft, an auxiliary shift control for drivingly connecting said auxiliary transmission output shaft to said auxiliary transmission input through one of a plurality of selective ratios, said auxiliary shift control comprising a shift fork shiftable to a first axial position to drivingly engage said auxiliary transmission output shaft with said auxiliary transmission input at a first selectable ratio and to a second axial position to drivingly engage said auxiliary transmission output shaft with said auxiliary transmission input at a second selectable ratio; and an auxiliary transmission disengagement control having a first position for selectively positioning and locking said auxiliary transmission shift control shift fork in a third axial position axially interposed said first and second axial positions whereat said auxiliary transmission output shaft is drivingly disengaged from said auxiliary input, said disengagement control having a second position allowing said auxiliary transmission shift control to drivingly engage said auxiliary output shaft to said auxiliary input shaft, said disengagement control, once positioned in said first position, effective to prevent engagement of said auxiliary transmission output shaft with said auxiliary transmission input until said disengagement control is positioned in said second position simultaneously with said main transmission output shaft being disengaged from said main transmission input shaft.

2. The compound transmission of claim 1, wherein said shift fork is axially carried by a two-sided piston slidably received in a cylinder, said auxiliary shift control effective to selectively supply fluid to said cylinder on one of either side of said piston and to vent the other side of said cylinder, said disengagement control effective to vent both sides of said cylinder.

3. The compound transmission of claim 2, wherein said disengagement control includes a fluid actuated ram engageable with said piston to position and lock said piston in said third axial position.

4. The compound transmission of claim 3, wherein the leading end of said ram carries ramps engageable with ramps carried by said piston when said piston is in the first and second axial positions thereof.

5. A change gear compound transmission comprising a main transmission section connected in series with a change gear auxiliary transmission, a main transmission shifting mechanism for selectively shifting said main transmission section into neutral and into one of a plurality of selectable drive ratios, an auxiliary transmission shifting mechanism for selecting either one of two selectable auxiliary transmission drive ratios, said auxiliary transmission shifting mechanism comprising a two faced piston slidably received in a shift cylinder and valving means for selectively supplying pressurized fluid to either one of two ends of the cylinder and venting the other end of the cylinder for shifting said piston to either one of a first and second selectable axial positions, a neutral positioning and locking mechanism independently operable of said auxiliary transmission shifting mechanism for positioning and locking said piston in a third axial position intermediate said first and second axial positions, said positioning and locking mechanism comprising a two position selector switch for selective actuating and deactuating said positioning and locking mechanism, a pressurized fluid actuated ram having an extended and retracted position, said ram having a leading edge effective, in the extended position of said ram, to engage said piston in any position thereof to position and then to lock said piston in said third axial position, actuation of said positioning and locking mechanism effective to exhaust both ends of said cylinder and to move said ram to the extended position.

6. The transmission of claim 5, additionally including means to sense said main transmission being in the neutral condition and to provide a signal in response thereto, said positioning and locking mechanism, once activated, effective to maintain said piston in said third axial position until said positioning and locking mechanism is deactivated simultaneously with said main transmission section shifted into neutral.

7. The transmission of claim 6, wherein the leading end of said ram carries ramps engageable with mating ramps carried by said piston.

8. The transmission of claim 6, wherein said ram comprise a two-faced ram piston slidably received in a ram cylinder, pressurization of one end of said ram cylinder and venting of the other end of ram cylinder effective to extend said ram, pressurizing of said other end of said ram cylinder and venting of said one end of said ram cylinder effective to retract said ram, the supply of pressurized fluid to said other end of said ram cylinder controlled by a valve which is open only when said main transmission section is in neutral, said supply to said valve only pressurized when said selector switch is in the deactivated position.

9. The transmission of claim 8, additionally comprising means associated with said ram piston to resiliently retain said ram in the extended or retracted position thereof.

10. The transmission of claim 8, wherein said ram piston carries a drag ring to create a frictional drag between said ram piston and said ram cylinder.

11. The transmission of claim 9 or 10, wherein said auxiliary transmission section comprises an input driven by the main transmission section, at least one countershaft constantly engaged with the input and an output shaft, said piston in the first and second axial positions thereof effective to drivingly engage said output shaft to said input shaft and in said third position to disengage said output shaft from said input.

12. The transmission of claim 11, wherein said piston carries a shift fork axially fixed thereto.

13. The transmission of claim 9 or 10, wherein said piston is controlled by a directional control valve, said directional control valve being remotely controlled by a master shift selector valve.

14. A transmission control for a compound change gear transmission having a main change speed gear group and an auxiliary change speed gear group connected in series therewith, comprising:
a main gear group shifting control for shifting said main gear group to one of a plurality of selectable gear ratios or into neutral;
an auxiliary gear group shifting control for shifting said auxiliary gear group into one of a plurality of selectable gear ratios, said auxiliary shifting control comprising an axially movable control member having a first axial position for shifting said auxiliary gear group into a first selected gear ratio and a second axial position for shifting said auxiliary gear group into a second selected gear ratio; and
an auxiliary gear group neutral positioning and locking control for selectively positioning and locking said axially movable control member in a third axial position whereat said auxiliary gear group is in neutral, said positioning and locking control comprising selector means for activating or deactivating said positioning and locking control and monitoring means for sensing if said main gear group is in neutral and providing a signal in response thereto, said positioning and locking control, once activated, effective to maintain control member in said third axial position until said main gear group is in neutral simultaneously with said positioning and locking control being deactivated.

15. The control of claim 14, wherein said axially movable control member comprises a two-sided shift piston slidably received a shift cylinder, said shift piston dividing said shift cylinder into a first and second chamber, a first fluid passage connected to said first chamber and a second fluid passage connected to said second chamber and a directional control valve for connecting a selected one of said first and second passages to a source of pressurized fluid and venting the other of said first and second chambers, said positioning and locking control including a two-sided positioning and locking piston slidably received in a positioning and locking cylinder, said positioning and locking piston dividing said positioning and locking cylinder into a third and a fourth chamber, a third fluid passage connected to said third chamber and a fourth fluid passage connected to said fourth chamber, a positioning and locking ram carried by said positioning and locking piston, pressurization of said third chamber and venting of said fourth chamber effective to extend said ram and pressurization of said fourth chamber and venting said third chamber effective to retract said ram, said ram, in the extended position, effective to engage said shift piston and to position and lock said shift piston in said third axial position, said selector switch, in the activated position, effective to pressurize said third passage and to vent said first, second and fourth passages, a neutral inhibitor valve in said fourth passage interposed said source of pressurized fluid and said fourth chamber, said neutral inhibitor valve responsive to said signal from said monitoring means to allow fluid flow from said source to said fourth chamber only if said main gear group is in neutral and to vent said fourth chamber if said main gear group is not in neutral.

16. The control of claim 14, additionally comprising means associated with said ram piston to resiliently retain said ram in the extended or retracted position thereof.

17. The control of claim 14, wherein said positioning and locking piston carries a drag ring for creating a frictional drag between said positioning and locking cylinder and said positioning and locking piston.

18. The control of claims 14, 15, or 16, wherein said auxiliary gear group comprises an input gear driven by the main gear group, at least one countershaft constantly driven by the input gear and an output shaft selectively drivingly engageable to said input gear and said countershaft by said axial control member in the first and second axial positions thereof.

19. The control of claims 14, 15 or 16, wherein said ram is extendable and retractable in a direction substantially normal to the axial direction of movement of said shift piston, said ram carrying ramps on its leading end to engage complimentary ramps carried by said shift piston for positioning said shift piston in the third axial position thereof, and said ram having locking surfaces for engagement with complimentary surfaces on said shift positioning to retain said shift piston in the third axial position thereof.

20. An improved control system for the auxiliary section of a compound change speed transmission of the type comprising a main change speed section selectively shiftable into one of a plurality of selectable ratios and into neutral and an auxiliary change speed section connected in series with the main section, said auxiliary section including an auxiliary shift control for selectively shifting said auxiliary section into either one of two selectable ratios, said auxiliary shift control comprising a source of pressurized fluid, a two position directional control valve having an inlet connected to said source, a shift cylinder divided by a two-faced shift piston into a first and second chamber, a first passage connecting said directional control valve to said first chamber, a second passage connecting said directional control valve to said second chamber, said directional control valve in the first position thereof effective to connect said first passage to said directional control valve inlet and to vent said second passage, said directional control valve in the second position thereof effective to connect said second passage to said directional control valve inlet and to vent said first passage and first means to selectively position said directional control valve in either the first or second position thereof, said improvement comprising:
a normally open pilot valve interposed said source and the inlet to said directional control valve, said pilot valve in the open position permitting fluid flow from said source to said inlet of said directional control valve, said pilot valve when closed effective to block the flow of fluid from source to said inlet to said directional control valve and to vent said inlet to said directional control valve;

a third passage connected to said pilot valve, said third passage when pressurized effective to close said pilot valve;

a neutral positioning and locking cylinder divided into a third and a fourth chamber by a two-faced neutral positioning and locking piston, a fourth passage connected to said third chamber, a fifth passage connected to said fourth chamber, a ram carried by said neutral positioning and locking piston, pressurization of said third chamber and venting of said fourth chamber effective to extend said ram, venting of said third chamber and pressurization of said fourth chamber effective to retract said ram, said ram in the extended position effective to engage said piston and position and lock said piston in an axial position whereat said auxiliary transmission will be in neutral;

second means for sensing if said main section is in neutral and for providing a signal in response thereto;

a two position neutral inhibitor valve, said valve operable in response to said signal from said second means, said inhibitor valve response to vent said fifth passage if said main section not in neutral and to connect said fifth passage to a sixth passage if said main section is in neutral;

a two position neutral positioning and locking valve having an inlet connected to said source, said neutral positioning and locking valve effective to connect said third and fourth passages to said source in the first position thereof and to connect said sixth passage to said source and to vent third and fourth passages in the second position thereof, and third means to position said positioning and locking valve in either the first or second position thereof, said third means independently operable of said first means.

* * * * *